United States Patent
Ozfidan

(10) Patent No.: US 11,481,354 B2
(45) Date of Patent: Oct. 25, 2022

(54) SYSTEMS AND METHODS FOR CALCULATING THE GROUND STATE OF NON-DIAGONAL HAMILTONIANS

(71) Applicant: D-WAVE SYSTEMS INC., Burnaby (CA)

(72) Inventor: A. Isil Ozfidan, Burnaby (CA)

(73) Assignee: D-WAVE SYSTEMS INC., Burnaby (CA)

( * ) Notice: Subject to any disclaimer, the term of this patent is extended or adjusted under 35 U.S.C. 154(b) by 784 days.

(21) Appl. No.: 16/375,567

(22) Filed: Apr. 4, 2019

(65) Prior Publication Data

US 2019/0324943 A1    Oct. 24, 2019

Related U.S. Application Data

(60) Provisional application No. 62/661,986, filed on Apr. 24, 2018.

(51) Int. Cl.
*G06F 15/82* (2006.01)
*G06N 10/00* (2022.01)

(52) U.S. Cl.
CPC ............. *G06F 15/82* (2013.01); *G06N 10/00* (2019.01)

(58) Field of Classification Search
CPC ................................ G06F 15/82; G06N 10/00
USPC ........................................................ 706/62
See application file for complete search history.

(56) References Cited

U.S. PATENT DOCUMENTS

| | | | |
|---|---|---|---|
| 7,135,701 B2 | 11/2006 | Amin et al. | |
| 7,369,035 B2 | 5/2008 | Konno et al. | |
| 7,398,163 B2 | 7/2008 | Tsukamoto et al. | |
| 7,418,283 B2 | 8/2008 | Amin | |
| 7,533,068 B2 | 5/2009 | Maassen et al. | |
| 7,619,437 B2 | 11/2009 | Thom et al. | |
| 7,639,035 B2 | 12/2009 | Berkley | |
| 7,870,087 B2 | 1/2011 | Macready et al. | |
| 7,870,523 B1 | 1/2011 | Uziel et al. | |
| 7,876,248 B2 | 1/2011 | Berkley et al. | |

(Continued)

FOREIGN PATENT DOCUMENTS

| | | |
|---|---|---|
| KR | 20160132943 A | 11/2016 |
| KR | 20180067006 A | 6/2018 |
| WO | 2012064974 A2 | 5/2012 |

OTHER PUBLICATIONS

Amin, "Effect of Local Minima on Adiabatic Quantum Optimization," Physical Review Letters 100(130503), 2008, 4 pages.

(Continued)

*Primary Examiner* — Tomi Skibinski
(74) *Attorney, Agent, or Firm* — Cozen O'Connor

(57) ABSTRACT

A hybrid computing system comprising a digital and an analog processor calculates the ground energy state of a non-diagonal Hamiltonian via diagonalization of the Hamiltonian in different bases and reverse annealing. A first basis is rotated to render part of the Hamiltonian diagonal, then the quantum processor evolves backwards until a value s* of the normalized evolution coefficient. Another basis is rotated to render another part of the Hamiltonian diagonal and the quantum processor evolves backwards again until s*. The bases can be rotated via discrete Fourier transform. The quantum processor may pause for a time t after each backward evolution. The ground state energy is calculated using the final ground states.

20 Claims, 4 Drawing Sheets

(56) References Cited

U.S. PATENT DOCUMENTS

| | | |
|---|---|---|
| 7,898,282 B2 | 3/2011 | Harris et al. |
| 7,984,012 B2 | 7/2011 | Coury et al. |
| 8,008,942 B2 | 8/2011 | Van et al. |
| 8,035,540 B2 | 10/2011 | Berkley et al. |
| 8,190,548 B2 | 5/2012 | Choi |
| 8,195,596 B2 | 6/2012 | Rose et al. |
| 8,195,726 B2 | 6/2012 | MacReady et al. |
| 8,283,943 B2 | 10/2012 | Van Den Brink et al. |
| 8,421,053 B2 | 4/2013 | Bunyk et al. |
| 8,437,818 B1 | 5/2013 | Tolpygo et al. |
| 8,464,542 B2 | 6/2013 | Hilton et al. |
| 8,494,993 B2 | 7/2013 | Harris et al. |
| 9,875,444 B2 | 1/2018 | King |
| 10,031,887 B2 | 7/2018 | Raymond |
| 10,552,755 B2 | 2/2020 | Lanting et al. |
| 11,194,573 B1 | 12/2021 | Smith |
| 2005/0224784 A1 | 10/2005 | Amin et al. |
| 2006/0225165 A1 | 10/2006 | Maassen et al. |
| 2007/0239366 A1 | 10/2007 | Hilton et al. |
| 2008/0065573 A1 | 3/2008 | Macready |
| 2009/0070402 A1 | 3/2009 | Rose et al. |
| 2009/0075825 A1 | 3/2009 | Rose et al. |
| 2009/0232191 A1 | 9/2009 | Gupta et al. |
| 2009/0299947 A1 | 12/2009 | Amin et al. |
| 2010/0281885 A1 | 11/2010 | Black et al. |
| 2011/0022820 A1 | 1/2011 | Bunyk et al. |
| 2011/0060710 A1 | 3/2011 | Amin |
| 2011/0065585 A1 | 3/2011 | Lanting et al. |
| 2011/0231462 A1 | 9/2011 | Macready et al. |
| 2011/0298489 A1 | 12/2011 | Van et al. |
| 2013/0117200 A1 | 5/2013 | Thom |
| 2013/0282636 A1 | 10/2013 | Macready et al. |
| 2014/0025606 A1 | 1/2014 | Macready |
| 2014/0187427 A1 | 7/2014 | Macready et al. |
| 2015/0358022 A1 | 12/2015 | McDermott et al. |
| 2016/0321559 A1 | 11/2016 | Rose et al. |
| 2017/0177534 A1 | 6/2017 | Mohseni et al. |
| 2017/0255629 A1 | 9/2017 | Thom et al. |
| 2017/0255872 A1 | 9/2017 | Hamze et al. |
| 2017/0300817 A1* | 10/2017 | King ................. G06N 3/126 |
| 2018/0091440 A1 | 3/2018 | Dadashikelayeh et al. |
| 2918/0091440 | 3/2018 | Dadashikelayeh et al. |
| 2018/0218279 A1 | 8/2018 | Lechner et al. |
| 2018/0246851 A1 | 8/2018 | Zaribafiyan et al. |
| 2018/0260245 A1 | 9/2018 | Smith |
| 2018/0365585 A1 | 12/2018 | Smith et al. |
| 2020/0026551 A1 | 1/2020 | Ducore et al. |
| 2020/0073739 A1 | 3/2020 | Rungta et al. |
| 2021/0357797 A1* | 11/2021 | Karalekas ........... G06F 9/45558 |

OTHER PUBLICATIONS

B. Bauer et al., "Hybrid Quantum Classical Approach to Correlated Materials", arXiv.1510.03859V2, Aug. 29, 2016.

Booth, M. et al., "Partitioning Optimization Problems for Hybrid Classical/Quantum Execution," D-Wave Technical Report, Jan. 9, 2017, 13 pages.

E. Blanzieri et al., "Quantum Annealing Tabu Search for QUBO Optimization", arXiv.1810.09342V1, Oct. 22, 2018.

Inoue et al. "Simulation and Experimental Demonstration of Logic Circuits Using an Ultra-Low-Power Adiabatic Quantum-Flux-Parametron," in IEEE Transactions on Applied Superconductivity, vol. 23, No. 3, pp. 1301105-1301105, Jun. 2013.

International Search Report and Written Opinion for PCT/US2020/013366, dated May 7, 2020, 9 pages.

Non-Final Office Action Issued in U.S. Appl. No. 16/601,097 dated Apr. 8, 2022, 22 pages.

Non-Final Office Action Issued in U.S. Appl. No. 16/997,252 dated May 26, 2022, 13 pages.

Notice of Allowance dated Feb. 2, 2022, for Thom, "Systems and Methods for Analog Processing of Problem Graphs Having Arbitrary Size and/or Connectivity" U.S. Appl. No. 16/778,295; 29 pages.

O. A. Mukhanov, "Energy-Efficient Single Flux Quantum Technology," in IEEE Transactions on Applied Superconductivity, vol. 21, No. 3, pp. 760-769, Jun. 2011, doi: 10.1109/TASC.2010.2096792.

Pastorello, D. et al., "Quantum Annealing Learning Search for Solving QUBO Problems," arXiv:1810.09342v3 [quant-ph] Aug. 13, 2019, 17 pages.

S. R. Ekanayake, T. Lehmann, A. S. Dzurak and R. G. Clark, "Quantum bit controller and observer circuits in SOS-CMOS technology for gigahertz low-temperature operation," 2007 7th IEEE Conference on Nanotechnology (IEEE NANO), 2007, pp. 1283-1287.

Tran, T. et al., "A Hybrid Quantum-Classical Approach to Solving Scheduling Problems," Proceedings of the Ninth International Symposium on Combinational Search, 2016, 9 pages.

Williams, "Systems and Methods for Interacting With a Quantum Computing System," U.S. Appl. No. 61/811,457, filed Apr. 12, 2013, 55 pages.

Wocjan, Pawel, and Anura Abeyesinghe. "Speedup via quantum sampling." Physical Review A 78.4 (2008): 042336.

* cited by examiner

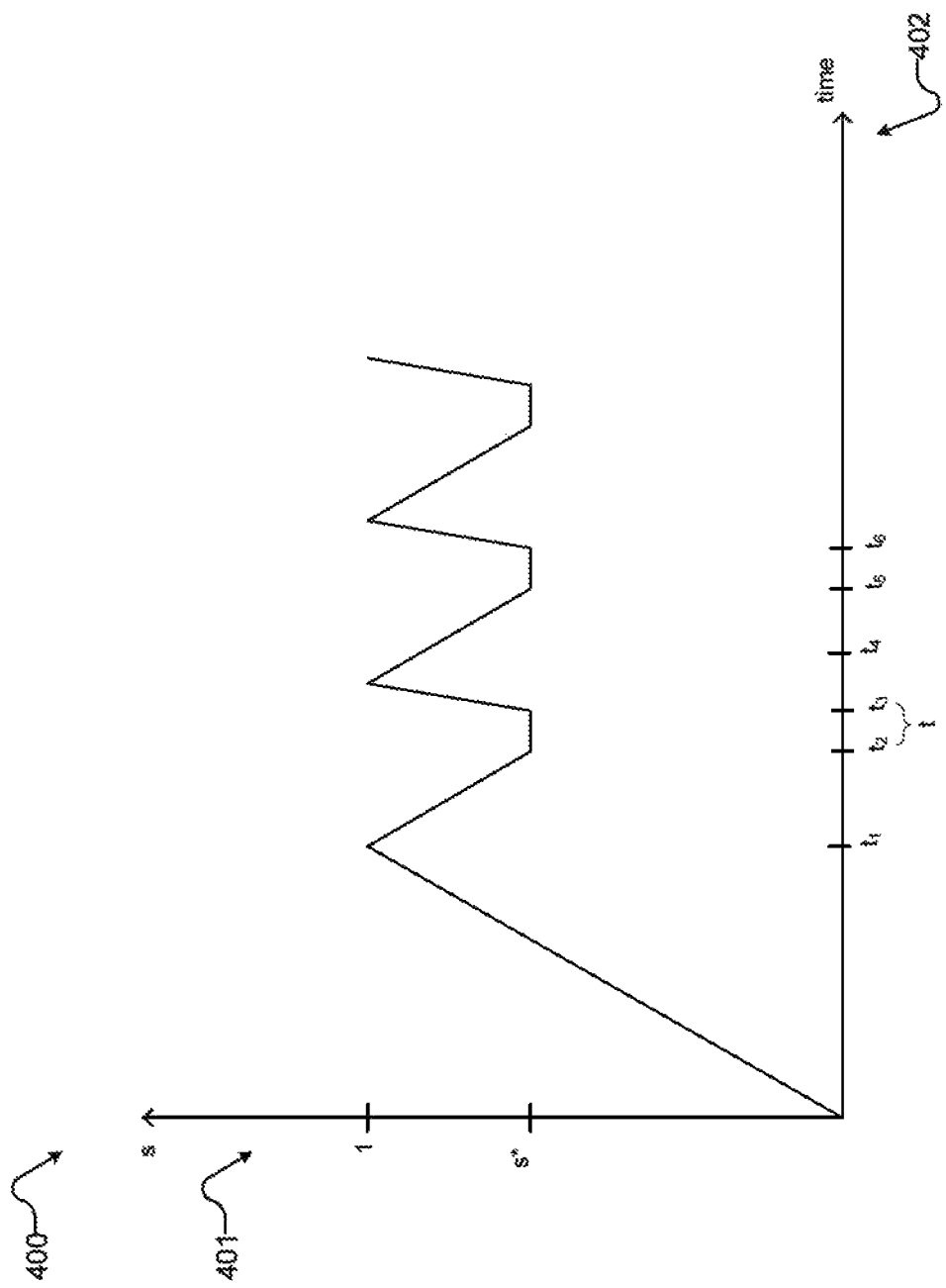

SYSTEMS AND METHODS FOR CALCULATING THE GROUND STATE OF NON-DIAGONAL HAMILTONIANS

FIELD

This disclosure generally relates to calculating the ground state of non-diagonal Hamiltonians in adiabatic quantum computers.

BACKGROUND

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, as a source of delocalization to reach a global energy minimum more accurately and/or more quickly than classical annealing. In quantum annealing thermal effects and other noise may be present. The final low-energy state may not be the global energy minimum. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. An objective function, such as an optimization problem, is encoded in a Hamiltonian Hp, and the algorithm introduces quantum effects by adding a disordering Hamiltonian $H_D$ that does not commute with Hp. An example case is:

$$H_E \propto A(t)H_D + B(t)H_P$$

where A(t) and B(t) are time dependent envelope functions. For example, A(t) can change from a large value to substantially zero during the evolution and $H_E$ can be thought of as an evolution Hamiltonian. The disorder is slowly removed by removing $H_D$ (i.e., by reducing A(t)).

Thus, in quantum annealing the system starts with an initial Hamiltonian and evolves through an evolution Hamiltonian to a final "problem" Hamiltonian Hp whose ground state encodes a solution to the problem. If the evolution is slow enough, the system may settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, Hp may encode an optimization problem and therefore Hp may be diagonal in the subspace of the qubits that encode the solution, but the system does not necessarily stay in the ground state at all times. However a problem Hamiltonian that is non-diagonal in the subspace of the qubits may not be readily mapped to an adiabatic quantum system. There is thus a general desire for systems and methods for method to apply non-diagonal Hamiltonians to adiabatic quantum systems.

The energy landscape of Hp may be crafted so that its global minimum is the answer to the problem to be solved, and low-lying local minima are good approximations.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

A hybrid computing system comprises a quantum processor and a digital processor. A non-diagonal Hamiltonian comprises a first term and a second term, the first term diagonal in a first basis and the second term diagonal in a second basis, the second basis different from the first basis. A method of operating a hybrid computing system to calculate the ground state of a non-diagonal Hamiltonian comprises programming the quantum processor to evolve forwards with the first term in the first basis to a first ground state; applying a first transformation to the first basis; programming the quantum processor to evolve backwards with the second term in the second basis until reaching a value $s_1^*$ of the normalized evolution coefficient s; pausing the evolution of the quantum processor for a first period of time during the evolving backwards with the second term in the second basis; applying a second transformation to the second basis; programming the quantum processor to evolve backwards with the first terms in the first basis until reaching a value $s_2^*$ of the normalized evolution coefficient s; pausing the evolution of the quantum processor for a second period of time during the evolving backwards with the first term in the first basis; programming the quantum processor to evolve forwards with the first term in the first basis to a second ground state; reading out the second ground state; and using the second ground state to calculate the ground energy of the non-diagonal Hamiltonian.

The second transformation may be the inverse of the first transformation. The first transformation can be a discrete Fourier transform. The non-diagonal Hamiltonian may include a plurality of terms and the first transformation may render more than one term of the non-diagonal Hamiltonian diagonal in the first basis. The method may further comprise programming the quantum processor to evolve forward with the second term in the second basis to a third ground state after pausing the evolution of the quantum processor for a first period of time during the evolving backwards with the second term in the second basis; and reading out the third ground state. The quantum processor may evolve forwards with the first term in the first basis to a first set of ground states; and may evolve forwards with the first term in the first basis to a second set of ground states. The value $s_2^*$ of the normalized evolution coefficient s may be equal to $s_1^*$. The non-diagonal Hamiltonian may describe the electronic structure of a period lattice.

The method may further comprise until an exit condition is met, iteratively repeating: applying a first transformation to the first basis; programming the quantum processor to evolve backwards with the second term in the second basis until reaching a value $s_1^*$ of the normalized evolution coefficient s; pausing the evolution of the quantum processor a first period of time during the evolving backwards with the second term in the second basis; applying a second transformation to the second basis; programming the quantum processor to evolve backwards with the first term in the first basis until reaching a value $s_2^*$ of the normalized evolution coefficient s; pausing the evolution of the quantum processor 100 for a second period of time during the evolving backwards with the first term in the first basis; programming the quantum processor to evolve forwards with the first term in the first basis to a $n^{th}$ ground state; and reading out the $n^{th}$ ground state. The method may further comprise determining whether an exit condition has been met. The exit condition may be at least one of: an error condition is below an error 105 threshold and a number of evolution iterations has been completed.

A hybrid computing system comprises a quantum processor and a digital processor, and the digital processor operable to program the quantum processor with a first term of a non-diagonal Hamiltonian, the non-diagonal Hamiltonian comprising the first term and a second term, the first term diagonal in a first basis and the second term diagonal in a second basis different from the first basis, to evolve forwards in the first basis to a first ground state; apply a first transformation to the first basis; program the quantum processor to evolve backwards with the second term in the second basis until reaching a value $s_1^*$ of the normalized evolution coefficient s; pause the evolution of the quantum 115 processor for a first period of time during the evolving backwards with the second term in the second basis; apply a second transformation to the second basis; program the quantum processor to evolve backwards with the first term in the first basis until reaching a value $s_2^*$ of the normalized evolution coefficient s; pause the evolution of the quantum processor for a second period of time during the evolving 120 backwards with the first term in the first basis; program the quantum processor to evolve forwards with the first term in the first basis to a second ground state; read out the second ground state; and use the second ground state to calculate the ground energy of the non-diagonal Hamiltonian.

The second transformation may be the inverse of the first 125 transformation. The first transformation may be a discrete Fourier transform. The non-diagonal Hamiltonian may include a plurality of terms and the digital processor may be operable to apply a first transformation to the first basis so that more than one term of the non-diagonal Hamiltonian becomes diagonal. The digital processor may be further operable to program the quantum processor to evolve forward with 130 the second term in the second basis to a third ground state after pausing the evolution of the quantum processor for a first period of time during the evolving backwards with the second term in the second basis and to read out the third ground state.

The digital processor is further operable to program the quantum 135 processor to evolve forwards in the first basis to a first set of ground states and to cause the quantum processor to evolve forwards in the first basis to a second set of ground states. $s_2^*$ may be equal to $s_1^*$. The non-diagonal Hamiltonian may describe the electronic structure of a period lattice.

The digital processor may be further operable to, until an exit condition is met, iteratively repeat apply a first transformation to the first basis; program the quantum processor to evolve backwards with the second term in the second basis until reaching a value $s_1^*$ of the normalized evolution coefficient; pause the evolution of the quantum processor for a first period of time during the evolving backwards with the second term in the second basis; apply a second transformation to the second basis; program the quantum processor to evolve backwards with the first term in the first basis until reaching a value $s_2^*$ of the normalized evolution coefficient; pause the evolution of the quantum processor for a second period of time during the evolving backwards with the first term in the first basis; program the quantum processor to evolve forwards with the first term in the first basis to a $n^{th}$ ground state; and read out the $n^{th}$ ground state.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 4 is a chart showing an example evolution of an analog processor performed during an example implementation of the methods of FIG. 2 and FIG. 3.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
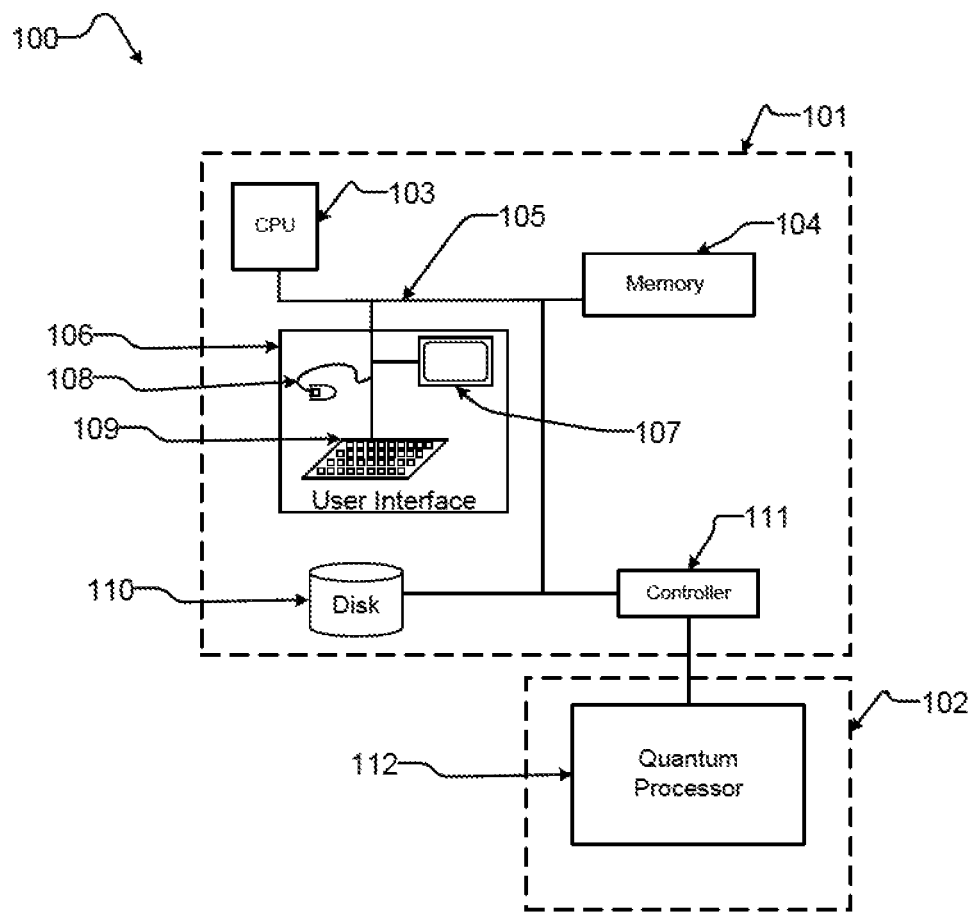
FIG. 1 is a schematic diagram showing a hybrid processor including at least one quantum processor and at least one digital processor according to the present system, devices, articles and methods.

FIG. 1 illustrates a hybrid computing system 100 including a digital computer 101 coupled to an analog computer 102. In some implementations the analog computer 102 is a quantum computer. The example digital computer 101 includes a digital processor (CPU) 103 that may be used to perform classical digital processing tasks.

Digital computer 101 may include at least one digital processor (such as central processor unit 103 with one or more cores), at least one system memory 104, and at least one system bus 105 that couples various system components, including system memory 104 to central processor unit 103. The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Digital computer 101 may include a user input/output subsystem 106. In some implementations, the user input/output subsystem includes one or more user input/output components such as a display 107, mouse 108, and/or keyboard 109.

System bus 105 can employ any known bus structures or architectures, including a memory bus with a memory controller, a peripheral bus, and a local bus. System memory 104 may include non-volatile memory, such as read-only memory ("ROM"), static random-access memory ("SRAM"), Flash NANO; and volatile memory such as random access memory ("RAM") (not shown).

Digital computer 101 may also include other non-transitory computer or processor-readable storage media or non-volatile memory 110. Non-volatile memory 110 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 110 may communicate with digital processor via system bus 105 and may include appropriate interfaces or controllers 111 coupled to system bus 105. Non-volatile memory 110 may serve as long-term storage for processor- or computer-readable instructions, data structures, or other data (sometimes called program modules) for digital computer 101.

Although digital computer 101 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 104. For example, system memory 104 may store instruction for communicating with remote clients and scheduling use of resources including resources on the digital computer 101 and analog computer 102.

In some implementations system memory 104 may store processor- or computer-readable calculation instructions to perform pre-processing, coprocessing, and post-processing to analog computer 102. System memory 104 may store at set of analog computer interface instructions to interact with the analog computer 102.

Analog computer 102 may include an analog processor such as quantum processor 112. The analog computer 102 can be provided in an isolated environment, for example, in an isolated environment that shields the internal elements of the quantum computer from heat, magnetic field, and other external noise (not shown).

Hybrid computing system 100 may be used to calculate the ground state of non-diagonal Hamiltonians, for example Hamiltonians defining the electronic structure of matter. The systems and methods described in the present disclosure and the appended claims may be used in the field of quantum chemistry.

Electronic structure Hamiltonians have two parts, kinetic (T) and potential (U). In the plane wave basis, the kinetic part T of the Hamiltonian is diagonal and can be represented by local $\sigma_z$ terms. The potential part U of the Hamiltonian can be diagonalized by taking the Fourier transform of the basis, thus allowing U to be represented by $\sigma_z^i \sigma_z^j$ and $\sigma_z^i$ terms, making T non-diagonal.

A Hamiltonian $H = \Sigma H_i$ can be decomposed via Trotterization into fundamental gates $e^{iH_i t}$ for use in gate model quantum computing. Switching gates on and off quickly will let the system represent the full Hamiltonian.

Instead of Trotterization, reverse annealing may be used in a hybrid computing system where the quantum processor is a quantum annealer. Using a hybrid computing system, for example hybrid computing system 100, the digital processor can rotate the basis and the resulting states can be evolved backwards by the quantum processor. Examples of reverse annealing are discussed in more detail in International Patent Publication No. WO2017214293A1.

A Hamiltonian H may be represented as $$H = T + U \qquad (1)$$

where T, the kinetic energy term, is diagonal in the plane wave basis (pw), and U, the potential energy term, is diagonal in the plane wave dual basis (pwd), i.e., the dual of the plane wave basis obtained by a unitary rotation. A basis is then chosen to evolve the quantum processor to an initial state. For example, the plane wave basis may be chosen.

The quantum processor is programmed with the part of the Hamiltonian that is diagonal in the plane wave basis (T)

$$H_P = T \qquad (2)$$

where $H_P$ is the problem Hamiltonian programmed into the quantum processor. The quantum processor evolves to an initial ground state(s) $\psi_0$.

Then the digital processor rotates the ground state basis from plane wave to plane wave dual, for example via a discrete Fourier transform (DFT)

$$DFT \psi_0 = \sum_i c_{ix} \phi_i \qquad (3)$$

where the coefficients $c_{ix}$ can be complex and negative, and $\phi_i$ are eigenstates of the new problem Hamiltonian.

The $\phi_i$ are used to program the quantum processor for reverse annealing (RA) under the problem Hamiltonian $H_P=U$. The quantum processor evolves backwards until a value s* of the normalized evolution coefficient. The digital processor reads out new states $$RA\phi_i = \sum_\chi a_{i\chi}\phi_\chi \qquad (4)$$

where all $a_{i\chi}$, representing the frequency of the individual samples, are normalized positive real numbers ≤1 and $\chi$ represents the individual samples read out.

The digital processor may store the coefficients $a_{i\chi}$ and $c_{ix}$ for future calculations. For example, the ground state after the first evolution $RA(DFT\Psi_0)=\Phi_1$ is approximated as a superposition of the form $\Phi_1=\Sigma_i c_{i0} \Sigma_\chi a_{i\chi}\phi_\chi$.

The digital processor then rotates the states $\phi_\chi$ obtained above into the plane basis, for example using an inverse discrete Fourier transform (IDFT).

$$IDFT\phi_\chi = \sum_x b_{x\chi}\psi_x \qquad (5)$$

The digital processor programs the quantum processor for reverse anneal with each $\psi_x$ under the problem Hamiltonian $H_P=T$. The quantum processor evolves backwards until s* and the digital processor reads out new states $$RA\psi_i = \sum_\chi a_{i\chi}\psi_\chi \qquad (6)$$

The digital processor can then calculate the ground states of the Hamiltonian H using the final ground states wavefunction obtained, either in the plane wave or the plane wave dual basis:

$$H(pw)\Psi_n = \epsilon_n \Psi_n \qquad (7)$$

$$H(pwd)\Psi_n = \epsilon_n \Phi_n \qquad (8)$$

Figure 2:
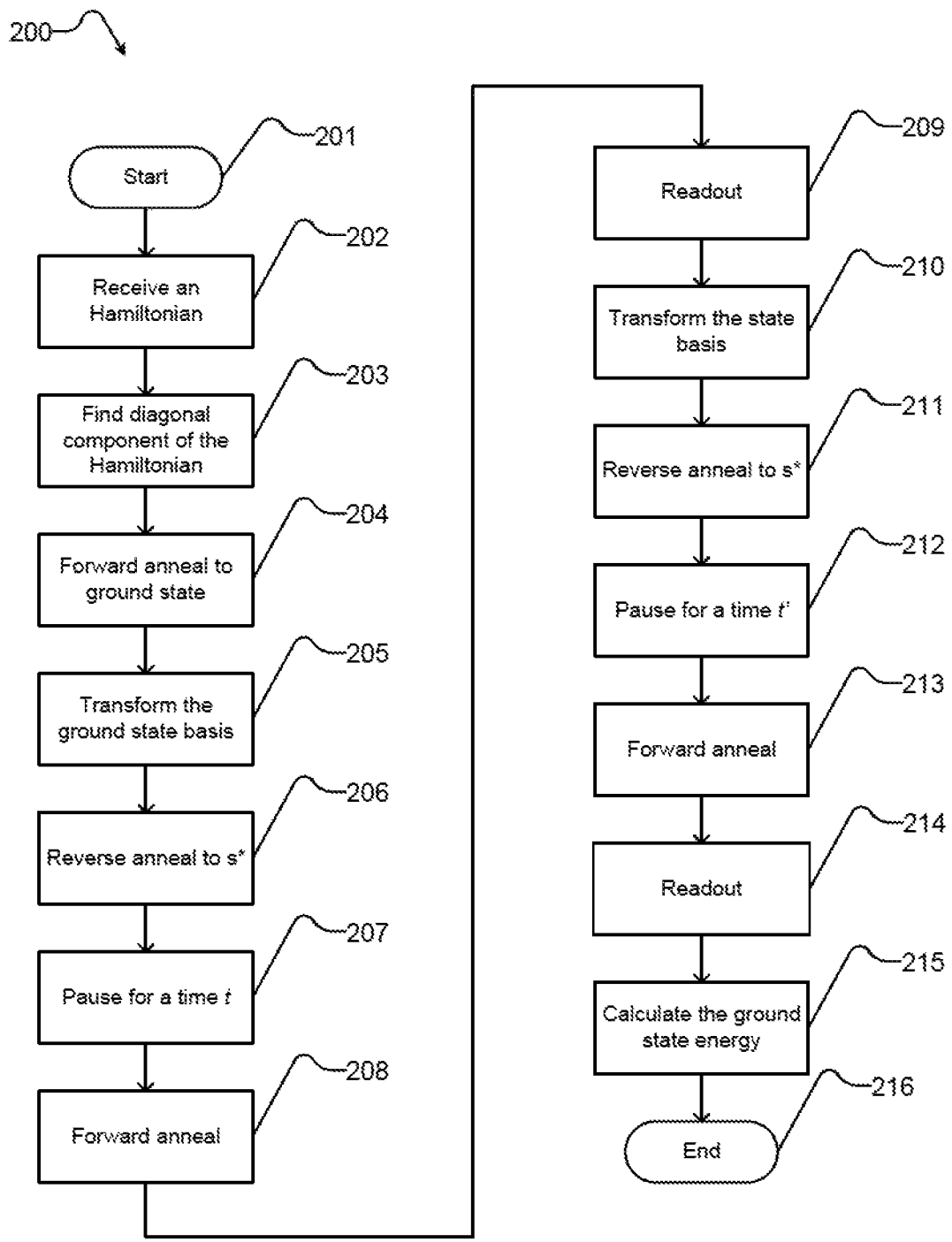
FIG. 2 is a flow diagram showing an example method of operating a hybrid processor system to calculate a ground state of a non-diagonal Hamiltonian with the hybrid computing system.

FIG. 2 is a flow diagram showing an example method 200 for calculating the ground state of a non-diagonal Hamiltonian with a hybrid computing system. The hybrid computing system comprises a digital processor and a quantum processor. An example hybrid computing system that can be employed for method 200 is described in greater detail in FIG. 1.

Method 200 comprises acts 201 to 216; however, a person skilled in the art will understand that the number of acts is an example, and, in some implementations, certain acts may be omitted, further acts may be added, and/or the order of the acts may be changed.

Method 200 starts at 201, for example in response to a call from another routine.

At 202, the digital processor receives a Hamiltonian. The Hamiltonian may be non-diagonal and comprising a plurality of terms. The Hamiltonian may represent the electronic structures of periodic lattices, for example homogeneous or uniform electron gas (jellium) or other chemical structures.

At 203, the digital processor applies a transformation to render the terms of the non-diagonal Hamiltonian diagonal in different bases. For example, a non-diagonal Hamiltonian H will be transformed in a non-diagonal Hamiltonian of the form H=T+U, where the two terms T and U are diagonal in either one of two bases. In one implementation T may be diagonal in the plane wave basis and U may be diagonal in the plane wave dual basis, i.e., the dual of the plane wave basis obtained by a unitary rotation.

Several methods may be applied at act 103. In at least one implementation, methods described in Babbush at al. (see https://arxiv.org/abs/1706.00023) may be employed.

At 204, the quantum processor is programmed to evolve forward in a basis where one term of the Hamiltonian H is diagonal. For example, in one implementation, the quantum processor may be programmed with a problem Hamiltonian $H_p=T$ in the plane wave basis. The quantum processor will reach a ground state $\psi_0$.

At 205, the digital processor applies a transformation to the ground state basis (e.g., the plane wave basis) so that another term of the non-diagonal Hamiltonian (e.g., U) is diagonal in the transformed ground state basis (e.g., the plane wave dual basis). In the case of Hamiltonians with a plurality of terms (e.g., more than two terms), more than one term may be diagonal in the transformed ground state basis.

In at least one implementation a discrete Fourier transform (DFT) may be applied $$DFT\psi_x = \sum_i c_{ix}\phi_i \qquad (3)$$

where the coefficients may be complex and/or negative and $\phi_i$ are eigenstates of the new problem Hamiltonian.

At 206, the quantum processor is programmed for reverse (backwards) evolution, or reverse anneal (RA), with another term of the non-diagonal Hamiltonian. For example, the quantum processor is programmed with $\phi_i$ from EQ (3) under the problem Hamiltonian $H_p=U$. The quantum processor evolves backwards until a value $s_1$* of the normalized evolution coefficient s. The value $s_1$* may be received by the digital processor as part of a set of inputs.

At 207, the digital processor causes the quantum processor to pause the evolution for a time t. Time t may be received by the digital processor as part of a set of inputs.

At 208, the digital processor causes the quantum processor to resume evolving forward, thus reaching a ground state or a set of ground states.

At 209, the digital processor reads out the states quantum processor.

$$RA\phi_i = \sum_\chi a_{i\chi}\phi_\chi \qquad (4)$$

where $\chi$ represents the individual samples read out and all $a_{i\chi}$, representing the frequency of the individual samples, may be normalized positive real numbers. The digital processor may store the coefficients $c_{ix}$ and $a_{i\chi}$ in a memory system for future calculations. In at least one implementation, act 209 is optional and method 200 proceeds from 208 to 210.

At 210, the digital processor applies a transformation to the state basis (e.g., the plane wave dual basis) so that another term of the non-diagonal Hamiltonian (e.g., T) is diagonal in the transformed basis (e.g., the plane wave basis). In one implementation an Inverse Fourier transform (IDFT) may be applied $$IDFT(\phi_\chi) = \sum_x b_{x\chi}\psi_x \qquad (5)$$

where the coefficients $b_{x\chi}$ may be complex and/or negative.

At 211, the quantum processor is programmed for reverse (backwards) anneal (RA) with another term of the non-diagonal Hamiltonian. For example, the quantum processor is programmed with each $\psi_x$ under the problem Hamiltonian $H_p$=T. The quantum processor evolves backwards until a value $s_2$* of the normalized evolution coefficient s. The value $s_2$* may be received by the digital processor as part of a set of inputs. In at least one implementation $s_2$* is equal $s_1$*.

At 212, the digital processor causes the quantum processor to pause the evolution for a time t'. Time t' may be received by the digital processor as part of a set of inputs. In at least one implementation, t=t'.

At 213, the digital processor causes the quantum processor to resume evolving forward, thus reaching a ground state or a set of ground states.

At 214, the digital processor reads out the states of the quantum processor $$RA\psi_i = \sum_\chi a_{i\chi} \psi_\chi \quad (6)$$

The digital processor may store the coefficients $c_{ix}$, $a_{i\chi}$ and $b_{x\chi}$ in a memory system for future calculations.

At 215, the digital processor calculates the ground energy of the non-diagonal Hamiltonian H using the final ground state function read out at 214. For example, if at act 211 the quantum processor is programmed in the plane wave basis (pw), the digital processor performs the calculation in the plane wave basis ($H_{pw}\psi_n=\epsilon_n\psi_n$, EQ (7)), otherwise if at act 211 the quantum processor is programmed in the plane wave dual basis (pwd), the digital processor performs the calculation in the plane wave dual basis ($H_{pwd}\phi_n=\epsilon_n\phi_n$, EQ(8)).

Method 200 terminates at 216, until it is, for example, invoked again.

Figure 3:
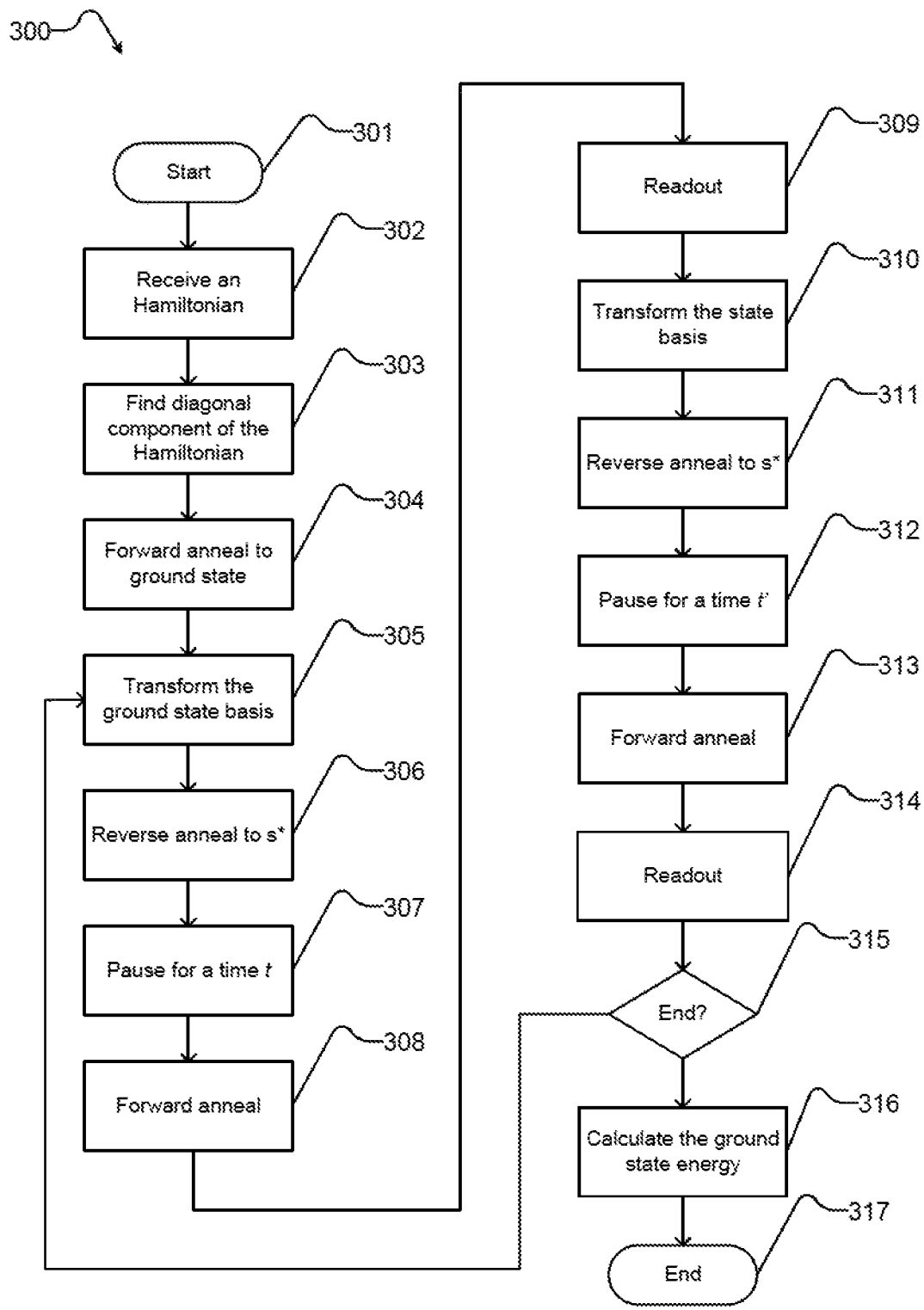
FIG. 3 is a flow diagram showing an example iterative method of operating a hybrid processor system to calculate a ground state of a non-diagonal Hamiltonian with the hybrid computing system.

FIG. 3 is a flow diagram showing an example iterative method 300 for calculating the ground state of a non-diagonal Hamiltonian with a hybrid computing system. The hybrid computing system comprises a digital processor and a quantum processor.

Method 300 comprises acts 301 to 317; however, a person skilled in the art will understand that the number of acts is an example, and, in some implementations, certain acts may be omitted, further acts may be added, and/or the order of the acts may be changed.

Method 300 starts at 301, for example in response to call from another routine.

At 302, the digital processor receives a Hamiltonian as described above with reference to act 202 of method 200.

At 303, the digital processor applies a transformation to the Hamiltonian received at 302, as described above with reference to act 103 of method 200.

At 304, the quantum processor is programmed to evolve forward, as described above with reference to act 204 of method 200.

At 305, the digital processor applies a transformation to the state basis, as described above with reference to act 205 of method 200.

At 306, the quantum processor is programmed for reverse (backwards) anneal, as described above with reference to act 206 of method 200.

At 307, the digital processor causes the quantum processor to pause, as described above with reference to act 207 of method 200.

At 308, the digital processor causes the quantum processor to resume evolving forward, as described above with reference to act 208 of method 200.

At 309, the digital processor reads out the states of the quantum processor, as described above with reference to act 209 od method 200. In at least one implementation, act 309 is optional and method 300 proceeds to 310.

At 310, the digital processor applies a transformation to the state basis, as described above with reference to act 210 of method 200.

At 311, the quantum processor is programmed for reverse (backwards) anneal, as described in act 211 of method 200.

At 312, the digital processor causes the quantum processor to pause the evolution, as describe above with reference to act 212 of method 200.

At 313, the digital processor causes the quantum processor to resume evolving forward, as describe above with reference to act 213 of method 200.

At 314, the digital processor reads out the states quantum processor, as described in act 214 of method 200.

At 315, the digital processor determines whether an exit condition has been met. In one implementation the exit condition is the completion of a determined number of iterations. In another implementation the exit condition is determining that an error factor is lower than an established threshold. In yet another implementation, the exit condition is the first to occur of: i) determining that an error factor is lower than an established threshold, and ii) completion of a determined number of iterations. If the exit condition is not met, method 300 continues to act 305. Otherwise to 316.

At 316, the digital processor calculates the ground energy of the non-diagonal Hamiltonian, as described above with reference to act 215 of method 200.

Method 300 terminates at 317, until it is, for example, invoked again.

Method 200 and 300 may be employed to calculate the ground energy of non-diagonal Hamiltonians. In one implementation, method 200 and/or may be employed to simulate electronic structures of periodic lattices, for example homogeneous or uniform electron gas (jellium) or other chemical structures.

FIG. 4 is a chart showing an example evolution 400 of an analog processor performed during an example implementation of method 200 of FIG. 2 or method 300 of FIG. 3. An analog processor may be a quantum processor.

Vertical axis 401 represents the normalized evolution coefficient s and horizontal axis 402 represents the time of the evolution of the analog processor. The normalized evolution coefficient s may represent the normalized flux applied to a compound Josephson junction or the normalized persistent current Ip of a flux qubit. The normalized evolution coefficient s changes monotonically over time, increasing from 0 to a maximum value of 1. A person skilled in the art will understand that the rate of change of the normalized evolution coefficient over time is shown in FIG. 4 for illustration purposes only and in other implementations the normalized evolution coefficient can increase at a slower or faster rate. In some implementations the normalized evolution coefficient s can change non-linearly. Examples of evolution schedules of analog processors are described in great details in Patent Publication No. US20180330264A1, which is here incorporated by reference. Techniques described herein are used to operate a hybrid processor comprising an analog processor and a digital processor where the normalized evolution coefficient s may increase and/or decrease over the course of the operation of the hybrid processor.

Before the start of example evolution 400 the hybrid processor may determine a classical spin state and apply preparatory bias to the analog processor to target the evolution of the analog processor towards the classical spin state. Preparatory bias may be applied via the analog processor's circuitry components, for example via on-chip DACs or analog lines. Preparatory bias may influence the evolution of the analog processor towards a classical state. When the analog processor is a quantum processor with n qubits, there are 2n classical states.

With reference to method 300 of FIG. 3, the normalized evolution coefficient s increases from 0 to 1 until time $t_1$ as described with reference to act of method 300.

From $t_1$ to $t_2$ the evolution of the analog processor resumes in a direction opposite the direction before time $t_1$, i.e., backwards and the normalized evolution coefficient s decreases from 1 to a value s*, as described before with reference to act 306 of method 300. The digital processor may determine the value of s* before the start of example evolution 400. A person skilled in the art may understand that a time interval (not shown in FIG. 4) may occur before the evolution of the analog processor resumes at $t_1$.

Where the analog processor is a quantum processor, the energy barriers of the qubits are lowered until an intermediate transverse field and/or tunneling energy is reached. The intermediate transverse field and/or tunneling energy may be determined by the digital processor.

After time $t_2$ the evolution of the analog processor is paused for a time interval $t_2$-$t_3$ (also indicated in FIG. 4 as t for simplicity). The time interval t may be determined by the digital processor before the start of example evolution 400.

A person skilled in the art will recognize that the rate of change of the normalized evolution coefficient between 0 and time $t_1$ may be the same as the rate of change between $t_1$ and $t_2$ or it may be different. The digital processor may determine the rate of change of s.

After time interval t, the evolution of the analog processor resumes in the same direction as the evolution from 0 to time $t_1$, i.e., the normalized evolution coefficient s increases from value s* to 1 until the analog processor reaches a classical spin state at $t_4$. Where the analog processor is a quantum processor the digital processor may raise the energy barriers of the qubits to reach a classical spin state. At $t_4$ the digital processor may read out this classical spin state, as described with reference to act 309 of method 300. The time interval during which the digital processor reads out the state of the analog processor is nor indicated in FIG. 4.

After time $t_4$ the evolution of the analog processor resumes in an opposite direction until a value s* of the normalized evolution coefficient sat time $t_5$ and then paused until time $t_6$, as described above with reference to acts 311 and 312 of method 300.

A person skilled in the art will recognized that the analog process may be programmed to repeat this evolution pattern one or more time as determined by the digital processor, as described above with reference to act 315 of method 300.

The above described method(s), process(es), or technique(s) could be implemented by a series of processor readable instructions stored on one or more non-transitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to U.S. provisional Patent Application No. 62/661,986; U.S. Patent Publication No. US20180330264A1; and International Patent Publication No. WO2017214293A1.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operating a hybrid computing system to calculate the ground state of a non-diagonal Hamiltonian, the hybrid computing system comprising a quantum processor and a digital processor, wherein the non-diagonal Hamiltonian comprises a first term and a second term, the first term diagonal in a first basis and the second term diagonal in a second basis, the second basis different from the first basis, the method comprising:

programming the quantum processor to evolve forwards with the first term in the first basis to a first ground state;

applying a first transformation to the first basis;

programming the quantum processor to evolve backwards with the second term in the second basis until reaching a value $s_1$* of the normalized evolution coefficient s;

causing the evolution of the quantum processor to pause for a first period of time during the evolving backwards with the second term in the second basis;
applying a second transformation to the second basis;
programming the quantum processor to evolve backwards with the first terms in the first basis until reaching a value $s_2^*$ of the normalized evolution coefficient s;
causing the evolution of the quantum processor to pause for a second period of time during the evolving backwards with the first term in the first basis;
programming the quantum processor to evolve forwards with the first term in the first basis to a second ground state;
reading out the second ground state; and
using the second ground state to calculate the ground energy of the non-diagonal Hamiltonian.

2. The method of claim 1 wherein applying a second transformation to the second basis includes applying to the second basis a second transformation that is the inverse of the first transformation.

3. The method of claim 2 wherein applying a first transformation to the first basis includes applying a discrete Fourier transform to the first basis.

4. The method of claim 1 wherein applying a first transformation to the first basis includes applying a first transformation to the first basis of a non-diagonal Hamiltonian that includes a plurality of terms and applying a first transformation to the first basis includes applying a first transformation to the first basis so that more than one term of the non-diagonal Hamiltonian becomes diagonal in the first basis.

5. The method of claim 1 further comprising programming the quantum processor to evolve forward with the second term in the second basis to a third ground state after pausing the evolution of the quantum processor for a first period of time during the evolving backwards with the second term in the second basis; and reading out the third ground state.

6. The method of claim 1 wherein programming the quantum processor to evolve forwards with the first term in the first basis to a first ground state includes programming the quantum processor to evolve forwards with the first term in the first basis to a first set of ground states; and further comprising programming the quantum processor to evolve forwards with the first term in the first basis to a second set of ground states before reading out the second set of ground states.

7. The method of claim 1 wherein programming the quantum processor to evolve backwards with the first term in the first basis until a value $s_2^*$ of the normalized evolution coefficient s includes programming the quantum processor to evolve backwards with the first term in the first basis until a value $s_2^*$ of the normalized evolution coefficient s is equal to $s_1^*$.

8. The method of claim 1 wherein calculating the ground energy of the non-diagonal Hamiltonian includes calculating the ground energy of a non-diagonal Hamiltonian describing the electronic structure of a period lattice.

9. The method of claim 8 further comprising determining whether an exit condition has been met.

10. The method of claim 9 wherein determining whether an exit condition has been met includes determining at least one of: whether an error condition is below an error threshold and whether a number of evolution iterations has been completed.

11. The method of claim 1 further comprising until an exit condition is met, iteratively repeating:
applying a first transformation to the first basis;
programming the quantum processor to evolve backwards with the second term in the second basis until reaching a value $s_1^*$ of the normalized evolution coefficient s;
causing the evolution of the quantum processor to pause for a first period of time during the evolving backwards with the second term in the second basis;
applying a second transformation to the second basis;
programming the quantum processor to evolve backwards with the first term in the first basis until reaching a value $s_2^*$ of the normalized evolution coefficient s;
causing the evolution of the quantum processor to pause for a second period of time during the evolving backwards with the first term in the first basis;
programming the quantum processor to evolve forwards with the first term in the first basis to a $n^{th}$ ground state; and
reading out the $n^{th}$ ground state.

12. A hybrid computing system, the hybrid computing system comprising a quantum processor and a digital processor, the digital processor operable to:
program the quantum processor with a first term of a non-diagonal Hamiltonian, the non-diagonal Hamiltonian comprising the first term and a second term, the first term diagonal in a first basis and the second term diagonal in a second basis different from the first basis, to evolve forwards in the first basis to a first ground state;
apply a first transformation to the first basis;
program the quantum processor to evolve backwards with the second term in the second basis until reaching a value $s_1^*$ of the normalized evolution coefficient s;
pause the evolution of the quantum processor for a first period of time during the evolving backwards with the second term in the second basis;
apply a second transformation to the second basis;
program the quantum processor to evolve backwards with the first term in the first basis until reaching a value $s_2^*$ of the normalized evolution coefficient s;
pause the evolution of the quantum processor for a second period of time during the evolving backwards with the first term in the first basis;
program the quantum processor to evolve forwards with the first term in the first basis to a second ground state;
read out the second ground state; and
use the second ground state to calculate the ground energy of the non-diagonal Hamiltonian.

13. The hybrid computing system of claim 12 wherein the second transformation is the inverse of the first transformation.

14. The hybrid computing system of claim 13 wherein the first transformation is a discrete Fourier transform.

15. The hybrid computing system of claim 12 wherein the non-diagonal Hamiltonian includes a plurality of terms and the digital processor is operable to apply a first transformation to the first basis so that more than one term of the non-diagonal Hamiltonian becomes diagonal.

16. The hybrid computing system of claim 12 wherein the digital processor is further operable to program the quantum processor to evolve forward with the second term in the second basis to a third ground state after pausing the evolution of the quantum processor for a first period of time during the evolving backwards with the second term in the second basis; and to read out the third ground state.

17. The hybrid computing system of claim 12 wherein the digital processor is further operable to program the quantum processor to evolve forwards in the first basis to a first set of ground states; and to cause the quantum processor to evolve forwards in the first basis to a second set of ground states before reading out the second set of ground states.

18. The hybrid computing system of claim 12 wherein $s_2^*$ is equal to $s_1^*$.

19. The hybrid computing system of claim 12 wherein the non-diagonal Hamiltonian describes the electronic structure of a period lattice.

20. The hybrid computing system of claim 12 wherein the digital processor is further operable to, until an exit condition is met, iteratively repeatedly:
- apply a first transformation to the first basis;
- program the quantum processor to evolve backwards with the second term in the second basis until reaching a value $s_1^*$ of the normalized evolution coefficient;
- pause the evolution of the quantum processor for a first period of time during the evolving backwards with the second term in the second basis;
- apply a second transformation to the second basis;
- program the quantum processor to evolve backwards with the first term in the first basis until reaching a value $s_2^*$ of the normalized evolution coefficient;
- pause the evolution of the quantum processor for a second period of time during the evolving backwards with the first term in the first basis;
- program the quantum processor to evolve forwards with the first term in the first basis to a $n^{th}$ ground state; and
- read out the $n^{th}$ ground state.

* * * * *